United States Patent [19]

Schilf

[11] Patent Number: 5,200,015
[45] Date of Patent: Apr. 6, 1993

[54] JOINING PROCESS FOR VACUUM HEAT INSULATING ELEMENTS

[75] Inventor: Lothar Schilf, Kirchlinteln, Fed. Rep. of Germany

[73] Assignee: Messerschmitt-Bolkow-Blohm GmbH, Fed. Rep. of Germany

[21] Appl. No.: 692,903

[22] Filed: Apr. 29, 1991

[30] Foreign Application Priority Data

May 18, 1990 [DE] Fed. Rep. of Germany ....... 4016048

[51] Int. Cl.$^5$ ............................................. B32B 31/06
[52] U.S. Cl. ............................. 156/304.2; 156/304.3; 285/47; 285/48
[58] Field of Search ................... 156/157, 304.2, 304.3; 285/47, 48

[56] References Cited

U.S. PATENT DOCUMENTS

| | | | |
|---|---|---|---|
| 3,369,826 | 2/1968 | Boosey et al. | 285/47 |
| 4,075,268 | 2/1978 | Nolan | 156/304.2 |
| 4,484,386 | 11/1984 | Stonitsch | 156/304.2 |

FOREIGN PATENT DOCUMENTS

| | | | |
|---|---|---|---|
| 75901 | 4/1983 | European Pat. Off. | 156/304.2 |
| 3318524 | 11/1983 | Fed. Rep. of Germany . | |
| 3416089 | 10/1985 | Fed. Rep. of Germany . | |
| 3634347 | 4/1988 | Fed. Rep. of Germany . | |
| 3630399 | 9/1989 | Fed. Rep. of Germany . | |
| 1567373 | 5/1980 | United Kingdom . | |
| 2139311 | 11/1984 | United Kingdom . | |

OTHER PUBLICATIONS

Development of Erno Vacuum Super Insulation. MBB-Vakuum-Super-Isolation (VSI).

Primary Examiner—Caleb Weston
Attorney, Agent, or Firm—Evenson, Wands, Edwards, Lenahan & McKeown

[57] ABSTRACT

A process for joining variously shaped vacuum heat insulating elements having edges adapted to be butted against each other or to overlap each other. A bellows is tightly connected with each vacuum heat insulating element in the area of its edges, the free edge of the bellows projecting beyond the element. The heat insulating elements are positioned such that the edges of the bellows rest against one another in an aligned manner or overlap, and the bellows are tightly connected with one another. The heat insulating elements are then moved against one another until their edges rest against one another or overlap, and are tightly connected with one another. The gap at the joint formed between the heat insulating elements and the bellows is evacuated and closed off tightly.

11 Claims, 1 Drawing Sheet

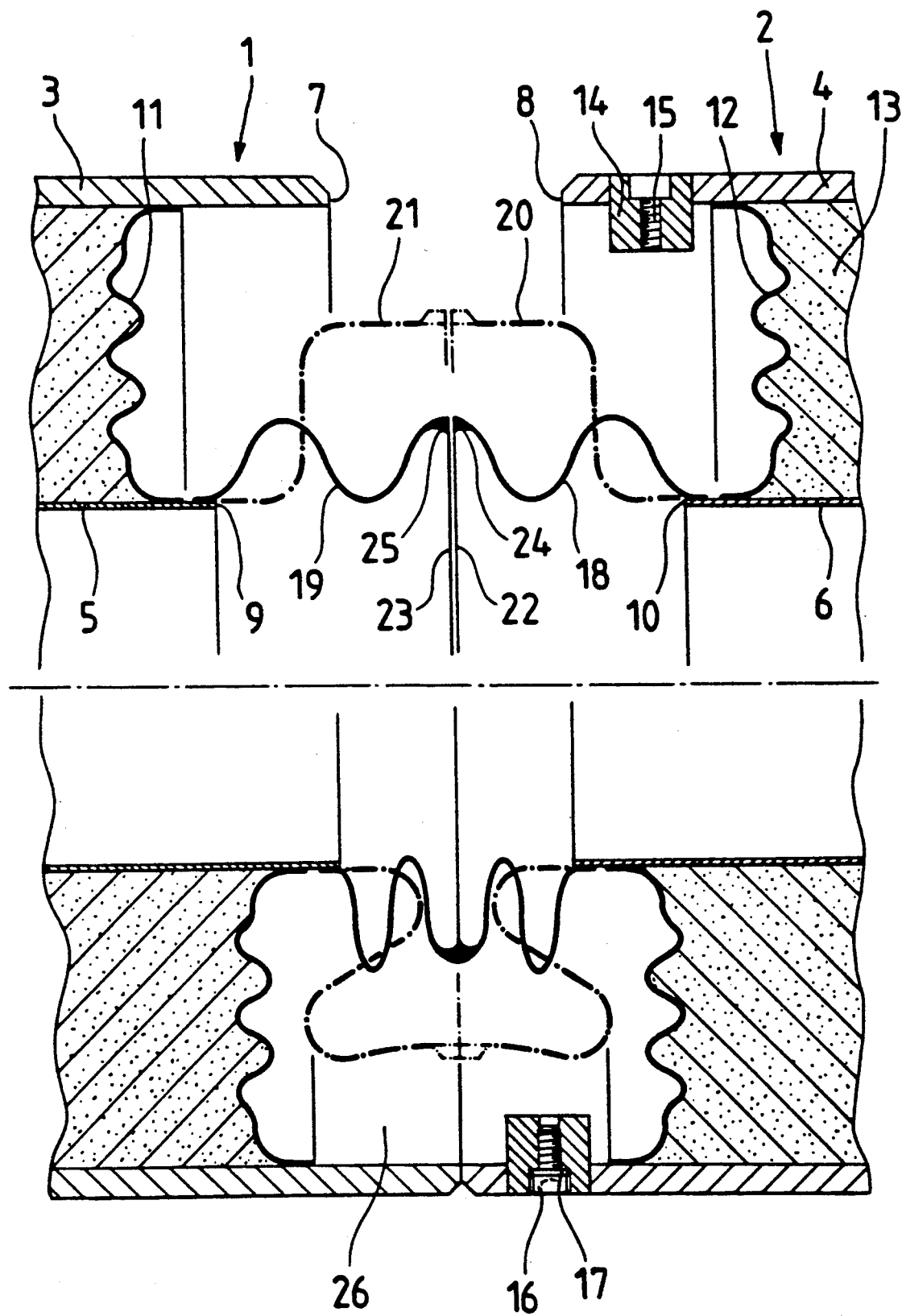

JOINING PROCESS FOR VACUUM HEAT INSULATING ELEMENTS

BACKGROUND AND SUMMARY OF THE INVENTION

The invention relates to a process for joining vacuum heat insulating elements which are fabricated in various shapes, including the shape of a pipe, a cylinder or a dome.

Vacuum heat insulating elements are hollow bodies comprised of substantially parallel surfaces, usually made of metal sheets, which are arranged at an approximately uniform separation from each other, and between which a vacuum is maintained, so as to inhibit the flow of thermal energy transversely between the surfaces, that is between the surface which is warmer and the surface which is colder. The hollow space is filled with a pressure-resistant powder which is a poor conductor of heat, such as siliceous earth, and is evacuated to a low pressure value, for example $10^{-3}$ bar. As the spacing device, the powder filling absorbs the pressure load caused by the atmospheric pressure or by the respective operational pressure (pressure pipes, pressure containers, etc.) and reduces radiant heat transmission. In the edge area, the two surfaces or walls of such elements are connected by thin-walled diaphragms corrugated in an essentially rippled shape and consisting of a material with a relatively low thermal conductivity (such as stainless steel) in order to reduce the heat transmission by conduction.

For specific applications, such as pipe lines and containers, it is useful to manufacture the heat insulating elements in the form of one-dimensionally or two-dimensionally curved surfaces with axially aligned, surrounding edges. Thus, a container, for example, may be made by connecting a hemispherical or dome shaped heat insulating element, a ring shaped or cylindrical element and another dome-shaped heat insulating element. Because of the fissured surfaces of the vacuum heat insulating elements caused by connection of the elements, surrounding gaps or hollow spaces (at the joints) exist which are particularly critical with respect to heat losses. The simplest—and least desirable—construction consists of connecting only the outside or inside walls of the vacuum heat insulating elements tightly with one another and leaving the gaps at the joint open on one side in the direction of the enclosed medium or the environment (generally: air). Thus, only a slight insulating effect exists in the joint area so that relatively high heat losses must be expected. (The space between the surfaces of the respective insulating elements themselves remains sealed, of course, by diaphragm type seals at the edges, as describe above.)

A substantial improvement can be achieved filling the gaps with insulating material (such as mineral wool, foamed material). The problems in this arrangement result from the resistance to temperature changes and the ageing properties of such materials, as well as the absorption of moisture and liquid. Also, the insulating effect of the gaps at the joints, is still clearly inferior to that of the heat insulating elements proper.

German Patent Document DE-OS 36 34 347, discloses a joint insulation for vacuum heat insulating elements which, on one side, rest flatly against a gastight, pressure-resistant wall. On the side that is opposite the pressure-resistant wall, the joints are covered and sealed with elastically deformable metal expansion sheets, are filled with pressure-resistant insulating material, and evacuated. In this manner, the insulating effect of the gaps at the joints is at least approximately as good as that of the heat insulating elements proper. This type of joint insulation is intended, however, for large-surface containers or large pipe lines which are covered by a plurality of plate-shaped, for example, rectangular vacuum heat insulating elements, whose gaps at the joints cross one another or merge into one another. Since the metal expansion sheets—at least in partial areas—must be mounted on the gaps at the joints subsequently, for example, by means of welding, good access of the joints is required on or in the structural component. This type of joint insulation causes problems with respect to manufacturing technology and finally is not useful in the case of interior insulations in relatively small containers.

It is therefore an object of the invention to provide a joining process for pipe-shaped, ring-shaped and dome-shaped vacuum heat insulating elements having axially aligned, surrounding edges, which can be used in the cryo-range as well as in the high-temperature range, which considerably reduces the energy losses in the area of the gap at the joints, which can be implemented in a simple manner and therefore can be used under industrial conditions as well as during mounting in the field, and which, among other things, may also be used for pipes and containers with a fairly small cross-section and with interior insulating.

These and other objects and advantages are achieved according to the invention, in which either only the outside walls or only the inside walls of the vacuum heat insulating elements are connected directly with one another in the edge area; the connection of the other walls takes place by way of an axially flexible surrounding bellows. All connections are vacuum-tight, so that the gaps at the joints which are enclosed on all sides can finally be evacuated. Before joining, the free edges of the bellows, which are connected with the heat insulating elements in a vacuum-tight manner, project axially. As a result, it is possible to first connect the bellows and then move the heat insulating elements into contact with each other and join them. Both joining operations, for example, in the form of welding, may be performed from the same side, for example, radially from the outside, which simplifies the operation. This feature of the invention makes possible the manufacturing of pipe lines and containers having a small cross-section and interior insulation. (That is, the bellows is disposed on the interior.) Since the surrounding bellows have a sufficient stiffness in the radial direction in order to absorb the mechanical stresses resulting from the pressure differences (evacuation, operating pressures), a filling of the gaps at the joints with pressure-resistant insulating material is not necessary, which also simplifies the process.

Other objects, advantages and novel features of the present invention will become apparent from the following detailed description of the invention when considered in conjunction with the accompanying drawings.

BRIEF DESCRIPTION OF THE DRAWINGS

The FIGURE is a simplified representation, above the dot-dash axis, of a longitudinal sectional view of two pipe-shaped vacuum heat insulating elements positioned for connection of the bellows. Below the axis is a comparable partial sectional view of the same elements in the position provided for the connection of the outer walls.

DETAILED DESCRIPTION OF THE DRAWING

The FIGURE illustrates the joint area of two pipe-shaped vacuum heat insulating elements 1 and 2 with interior insulation. Interior insulation means that the relatively thick, mechanically stressable outside walls 3 and 4 of the vacuum heat insulating elements 1 and 2 form the force-absorbing structure of the pipe line to be manufactured, whereas the relatively thin inside walls 5 and 6 perform primarily a sealing and flow-mechanical functions, and transmit forces resulting, for example, from the pressure of the enclosed medium, by way of the pressure-resistant insulating material, to the outside walls 3 and 4. In reverse, exterior insulation means that the supporting wall structure is situated inside the insulation, that is, is sheathed by it. The joining process according to the invention can also be used for exterior insulations; however, this requires that the internal cross-sections of the heat insulating elements to be connected are large enough to permit joining, such as welding, from the inside.

The illustrated vacuum heat insulating elements have outside and inside walls 3 and 4, 5 and 6 with a circular cross section. In practice it is also possible according to the invention, to connect elements with different cross-sectional shapes, such as oval shapes, elliptical shapes, rounded polygonal shapes, etc.

In the position shown in the FIGURE above the axis, the vacuum heat insulating elements 1 and 2 are aligned coaxially. The axially projecting edges 7 and 8 of the outside walls 3 and 4 are separated from one another, leaving an opening of several centimeters by which access is afforded to the respective bellows from the exterior of the pipe shaped elements. The accordian shaped diaphragms 11 and 12 are easily visible which, in each case bound the evacuated space with the pressure-resistant insulating material, here a siliceous-earth filling 13. In the area of the axially set-back edges 9 and 10, two bellows 18 and 19 are connected with the inside walls 5 and 6 in a vacuum-tight manner, for example, by welding, soldering or gluing. The surrounding bellows 18 and 19 have the typical bellows-type undulation with a periodically changing diameter.

Alternatively the bellows 20 and 21, may be designed in the manner of a "rolled-up sock seal" as indicated by a dash-dotted line. Functionally, however, this alternative does not differ from the bellows 18 and 19, that is, vacuum-tight, axially flexible connection of the inside walls 5 and 6.

The edges 22 and 23 of the bellows 18 and 19, which axially extend preferably one to several centimeters beyond the edges 7 and 8 of the outside walls 3 and 4, rest—like those of bellows 20 and 21—against one another in a flush and aligned manner, in which case—as shown—a small axial gap may be present. In view of the preferred connecting method (welding), the bellows 18 and 19, like the bellows 20 and 21, are thickened in the area of their edges 22 and 23, which is not absolutely necessary. The welding-together of the bellows may be performed simply from the outside through the gap between the edges 7 and 8 which, as a rule, measures several centimeters. If the bellows are to be connected by soldering, other designs of their edge area are more advantageous. For example, the edges of the bellows may be designed such that they can be inserted into one another (that is, overlap axially) with a slight radial play. However, they may also have front faces which are radially enlarged, for example by edging, to form a soldered joint.

After the connection of the bellows, the vacuum heat insulating elements 1 and 2 are moved axially toward one another until their edges 7 and 8 rest against one another in a flush and aligned manner. This condition is illustrated below the axis. When being pressed against one another, the bellows 18 and 19, 20 and 21 are elastically and possibly also plastically deformed, in which case, particularly the connecting points must not be excessively stressed.

The edges 7 and 8, are chamfered toward the outside so that they may be connected with one another from the outside in a vacuum-tight manner, for example, by means of a fillet-shaped weld seam (weld seam not shown). A soldered connection may also be used, in which case, the outside walls may be constructed in the edge area so that they can, for example, be inserted into one another and may be provided with axial stops. Under certain conditions (for example, when temperatures are not very high), a glued connection is also possible.

The torus-shaped gap 26 created at the joint by the connection of edges 7 and 8 and bellows 22 and 23 is now closed off tightly to all sides and can be evacuated. For this purpose, an evacuation port 14 with a closable opening 15 is provided in the outside wall 4 of the vacuum heat insulating element 2. By way of opening 15, a gate (not shown) is installed from the outside which is connected to a vacuum pump. After the gap 26 at the joint has been evacuated to a pressure of $<10^{-3}$ mbar, a screw plug 16 with a sealing ring 17, which is already situated in the interior of the gate, is screwed into the opening 15 whereby the latter is closed tightly. This condition is shown in the lower half of the FIGURE. The gate can now be removed, and the head of the screw plug 16 is welded together with the exterior side of the evacuating part 14 in a vacuum-tight manner whereby a reliable and durable seal is ensured.

On the end of the screw plug 16 situated on the side of the gap at the joint, a getter material (not shown) is arranged which is heated during the welding to at least 350° C., and is therefore activated. This lowers the pressure in the gap at the joint to the desired value of $10^{-5}./.10^{-6}$, whereby an excellent insulating effect of the gap 26 at the joint is achieved because virtually the only thermal-conduction losses are through the diaphragms 11 and 12 themselves.

The area around the edges 7 and 8, which are welded together, may, if necessary, be provided with an anti-corrosive agent; then the connecting point will be operable. The getter material may also be arranged at a different point in the gap at the joint and may be activated, for example, by electric current. Under certain circumstances, the getter material will not be necessary, and the evacuation may be performed solely by means of a pump.

The joining process according to the invention is highly suitable for the manufacturing of containers. The only differences are that the inner cross-sections, which in the case of containers are usually larger, also permit work from the interior (exterior insulation), and that pipe-shaped or ring-shaped heat insulating elements, which are axially open on both sides, as well as dome-shaped elements are used which axially are open only on one side.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for joining edges of variously shaped vacuum heat insulating elements in which a vacuum is maintained between two walls, said vacuum heat insulating elements having edges which are adapted to be connected to each other to form a joint for the manufacture of heat insulated cylinders and containers having an axis which defines an axial direction, each of said vacuum heat insulating elements being disposed along said axis, with their respective edges being joined to form said cylinder or container, said process comprising the steps of:

connecting axially flexible bellows members between said walls at the edges of each of said vacuum heat insulating members in a vacuum tight manner, whereby the area between said walls of said vacuum heat insulating elements is sealed, said bellows members having axial compressible portions extending axially from a first of said walls beyond the edges of the respective vacuum heat insulating elements, and having edge areas adapted to be connected to each other;

positioning said vacuum heat insulating elements so that the edge areas of the respective bellows members are positioned for connection to each other;

connecting the edge areas of said bellows members to each other in a vacuum-tight manner;

moving said vacuum heat insulating elements toward each other until their respective edges are positioned for connection to each other, whereby a torus shaped gap is formed between said joined bellows members and a second of said walls, adjacent the edges of said vacuum heat insulating elements;

connecting said second walls with one another in a vacuum tight manner;

evacuating said torus shaped gap to a predetermined pressure through at least one opening in said vacuum heat insulating elements; and sealing said opening.

2. Process according to claim 1, wherein said edges of said vacuum heat insulating elements are adapted to be butted against one another.

3. Process according to claim 1, wherein said edges of said vacuum heat insulating elements are adapted to overlap each other axially.

4. Process according to claim 1, wherein the edge areas of said bellows members are adapted to be butted against each other.

5. Process according to claim 1, wherein the edge areas of said bellows members are adapted to overlap each other axially.

6. Process according to claim 1, wherein during or after the sealing of said opening, a getter material is activated which is arranged in the gap at the joint, in order to still further lower the pressure in the gap.

7. Process according to claim 6, wherein the vacuum-tight closing of the opening and the activating of the getter material take place by the welding of a screw plug inserted in the opening, the getter material being arranged on the end of the screw plug on the side of the gap at the joint.

8. Process according to one of claim 1, wherein the vacuum-tight connection of the bellows members with one another and the connection of the second walls of the heat insulating elements with one another is achieved by welding.

9. Process according to one of claim 7, wherein the vacuum-tight connection of the bellows members with one another and the connection second walls of the heat insulating elements with one another is achieved by welding.

10. Process according to one of claim 8, wherein the vacuum-tight connection of the bellows members with one another and the connection of the second walls of the heat insulating elements with one another is achieved by welding.

11. Process according to claim 8, wherein the area of the weld connecting the vacuum heat insulating elements is subsequently provided with an anticorrosive agent.

* * * * *